Patented Oct. 11, 1927.

1,644,850

UNITED STATES PATENT OFFICE.

HEINRICH NERESHEIMER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY.

MANUFACTURE OF ISODIBENZANTHRONES.

No Drawing. Application filed February 9, 1926, Serial No. 87,167, and in Germany February 16, 1925.

I have found that isodibenzanthrones can be prepared in an advantageous manner by treating mixtures of Bz 1-benzanthrone-thio-ethers and benzanthrones not substituted in the Bz 1-position both components having a free 2-position with alkaline condensing agents. Generally, about equimolecular quantities of the two components will be employed, but the process is not limited to a certain proportion of the components. Mixtures of caustic alkalis with alcohols are especially suitable as condensing agents. It is advantageous to exclude oxygen during the condensation as far as possible, for example by introducing an inert or reducing gas.

The following example will further illustrate my invention which, however, is not limited to this example. The parts are by weight.

Example.

A mixture of 17.6 parts of benzanthrone-Bz 1-thio-paracresyl-ether corresponding to the formula

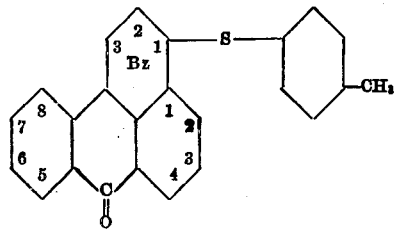

and 11.5 parts of benzanthrone are introduced into a solution of 50 parts of sodium in 500 parts of water-free ethyl alcohol heated to about 105 to 110 degrees centigrade while distilling off part of the alcohol, and kept at the said temperature for some hours while stirring. The isodibenzanthrone so prepared can be separated and purified in the usual manner. It is obtained in a considerably better yield and, owing to the use in part of simple benzanthrone, at a lower cost than when treating benzanthrone-Bz 1-thio-cresyl-ether alone in the same manner.

By using, instead of benzanthrone, a corresponding quantity of 6-chlor-benzanthrone of the formula

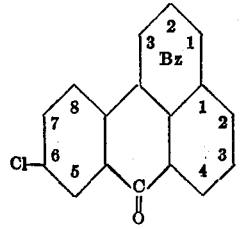

(see Scholl, Ber. d. Deutschen Chem. Gesellsch., vol. 55, p. 114) a mono-chlor-isodibenzanthrone is obtained. Other symmetrically or asymmetrically substituted isodibenzanthrones may be prepared in an analogous way.

What I claim is:

1. The process of manufacturing isodibenzanthrones which consists in treating a mixture of a benzanthrone-Bz 1-thio-ether having a free 2-position and a benzanthrone with free 2- and Bz 1-positions with an alkaline condensing agent substantially in the absence of oxygen.

2. The process of manufacturing isodibenzanthrones which consists in treating a mixture of about equimolecular proportions of a benzanthrone-Bz 1-thio-ether having a free 2-position and a benzanthrone with free 2- and Bz 1-positions with an alkaline condensing agent substantially in the absence of oxygen.

In testimony whereof I have hereunto set my hand.

HEINRICH NERESHEIMER.

CERTIFICATE OF CORRECTION.

Patent No. 1,644,850.             Granted October 11, 1927, to

HEINRICH NERESHEIMER.

It is hereby certified that the above numbered patent was erroneously issued to "I. G. Farbenindustrie Aktiengesellschaft, of Frankfort-on-the-Main, Germany, a Corporation of Germany", whereas said patent should have been issued to "Grasselli Dyestuff Corporation, of New York, N. Y., a Corporation of Delaware", said Corporation being assignee by mesne assignments of the entire interest in said invention, as shown by the records of assignments in this office; and that the said Letters Patent should be read with this correction therein that the same may conform to the record of the case in the Patent Office.

Signed and sealed this 8th day of November, A. D. 1927.

Seal.
                                             M. J. Moore,
                                    Acting Commissioner of Patents.